(12) United States Patent
Moroto et al.

(10) Patent No.: US 6,541,889 B2
(45) Date of Patent: Apr. 1, 2003

(54) DC MOTOR

(75) Inventors: Kiyonori Moroto, Kariya (JP); Eiji Iwanari, Chiryu (JP); Motoya Ito, Hekinan (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/098,042

(22) Filed: Mar. 15, 2002

(65) Prior Publication Data

US 2002/0130583 A1 Sep. 19, 2002

(30) Foreign Application Priority Data

Mar. 19, 2001 (JP) ........................................ 2001-078726
Jul. 31, 2001 (JP) ........................................ 2001-232461

(51) Int. Cl.⁷ ............................................... H02K 1/12
(52) U.S. Cl. ........................ 310/216; 310/266; 310/218; 310/217; 310/269
(58) Field of Search ................................ 310/216, 185, 310/242, 154.74, 181, 266, 218, 237

(56) References Cited

U.S. PATENT DOCUMENTS 4,835,839 A * 6/1989 Forbes ........................ 29/506
5,404,063 A * 4/1995 Mills ........................ 310/266
6,394,830 B1 * 4/2002 Huang ........................ 439/282

FOREIGN PATENT DOCUMENTS

JP    A-11-252842    9/1999

* cited by examiner

Primary Examiner—Thomas M. Dougherty
Assistant Examiner—Iraj A Mohandesi
(74) Attorney, Agent, or Firm—Nixon & Vanderhye P.C.

(57) ABSTRACT

In a DC motor, a plurality of bobbins is respectively mounted on teeth of an armature core. The armature core is comprised of an internal core unit and an external core unit that is coaxially disposed outside the internal core unit. A plurality of armature coils is respectively wound around the bobbins. A case has a plurality of first terminal members that are respectively connected to commutator segments. Each of the armature coils is connected to each other via the first terminal members. Each of the bobbins includes a second terminal member that is coupled to one of the first terminal members.

17 Claims, 7 Drawing Sheets

DC MOTOR

CROSS REFERENCE TO RELATED APPLICATION

The present application is based on and claims priority from the following Japanese Patent Applications: 2001-78726, filed Mar. 19, 2001; and 2001-232461, filed Jul. 31, 2001; the contents of which are incorporated herein by reference.

BACKGROUND OF THE INVENTION

1. Field of the Invention

The present invention relates to a DC motor that has an armature core comprised of an inner core and an outer core and an armature coil wound around a bobbin.

2. Description of the Related Art

An armature of a conventional DC motor is comprised of an armature core and an armature coil that is inserted into a plurality of slots to be wound around teeth of the armature core so that an end of each phase coil is welded to commutator segments of a commutator.

In the above armature, because each phase coil has to be inserted into one of the slots from the opening between the teeth, the space factor of the armature winding relative to the space of the slots is limited to a low value.

In addition, because the coil end is welded directly to the commutator, it is difficult to change connection of the phase coils, for example from series connection to parallel connection, or from star connection to delta connection, when the armature coil is mounted into the armature core.

SUMMARY OF THE INVENTION

Therefore, the present invention has been made in view of the above problems.

It is a main object of the invention to provide a DC motor that has a high space factor of the armature coil of the DC motor relative to the space of the slots of the armature core thereof.

Another object of the invention is to provide a DC motor that is easy to change connection of the armature coil.

According to a preferred embodiment of the invention, a DC motor includes an armature core that is comprised of an internal core unit and an external core unit coaxially disposed outside the core unit, a plurality of bobbin-and-armature-coil sets respectively mounted on teeth of the armature core, a case having a plurality of first terminal members respectively connected to commutator segments and the armature coils in a prescribed connection pattern.

Therefore, it is not necessary to directly wind the armature coils around the armature core, so that the space factor of the armature coil can be increased. In addition, because of the first terminal member, the connection of the armature winding can be changed easily only by changing the connection pattern of the first terminal member.

It is preferable that the first terminal members are integrated with the commutator.

It is also preferable that each of the bobbins includes a second terminal member that is coupled to one of the first terminal members. The armature coil wound around each bobbin is connected to the second terminal member, so that the connection of the armature coils can be easily carried out.

It is also preferable that each pair of the first terminal member and said second terminal member forms a male-female coupler. Therefore, reliable connection of the armature coils can be ensured.

The external core unit may be comprised of a plurality of circumferentially separated external cores each of which has one of the teeth and one of the bobbins.

In the DC motor, the bobbin may have a brim portion that fills up a gap between adjacent external cores, the external cores and said internal core unit may be connected to each other by projection-concavity connection.

It is also possible that each of the external cores has a dovetail projection, and that the internal core unit has a plurality of dovetail concavities each of which is fitted to the dovetail projection.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
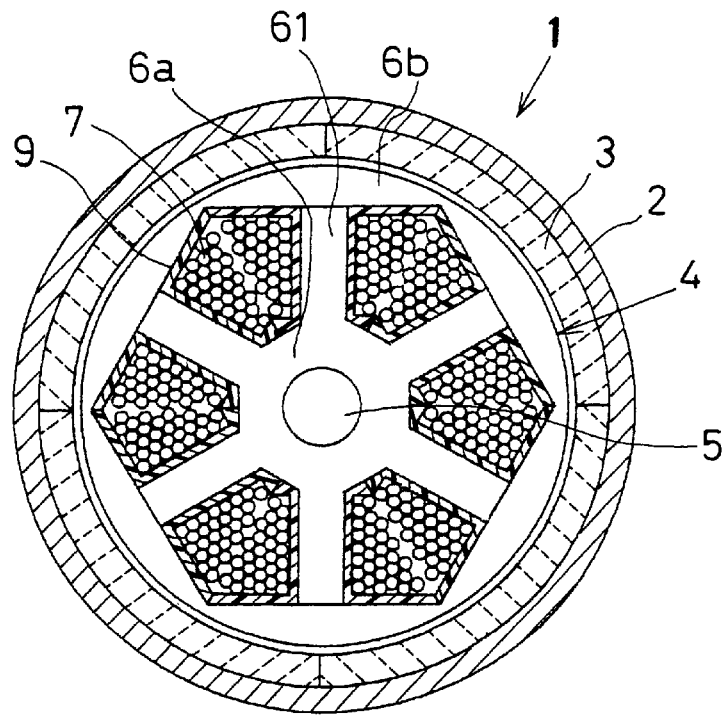
FIG. 1 is a cross-sectional view of a DC motor according to a first embodiment of the invention.

A DC motor 1 according to a first embodiment of the invention is described with reference to FIGS. 1–8.

The DC motor 1 is usually used for a motor-driven fuel pump to be mounted in an automotive vehicle and is comprised of a cylindrical yoke 2, a plurality of permanent magnets 3 that is disposed on the inside surface of the yoke 2 and an armature 4 that is rotatably disposed inside the plurality of permanent magnets 3.

The yoke 2 functions as a magnetic passage and a housing. Four permanent magnets 3 are aligned in the circumferential direction of the yoke 2 and magnetized to alternately form N and S magnetic poles. As shown in FIG.

5, the armature 4 is comprised of a rotary shaft 5, an armature core 6, a plurality of armature coils 7 and a commutator 8.

Figure 3B:
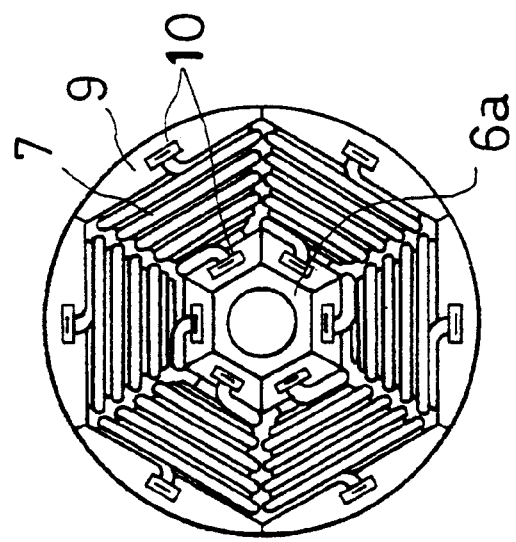
FIG. 3B is a front view of an armature of the DC motor according to the first embodiment.
Figure 3A:
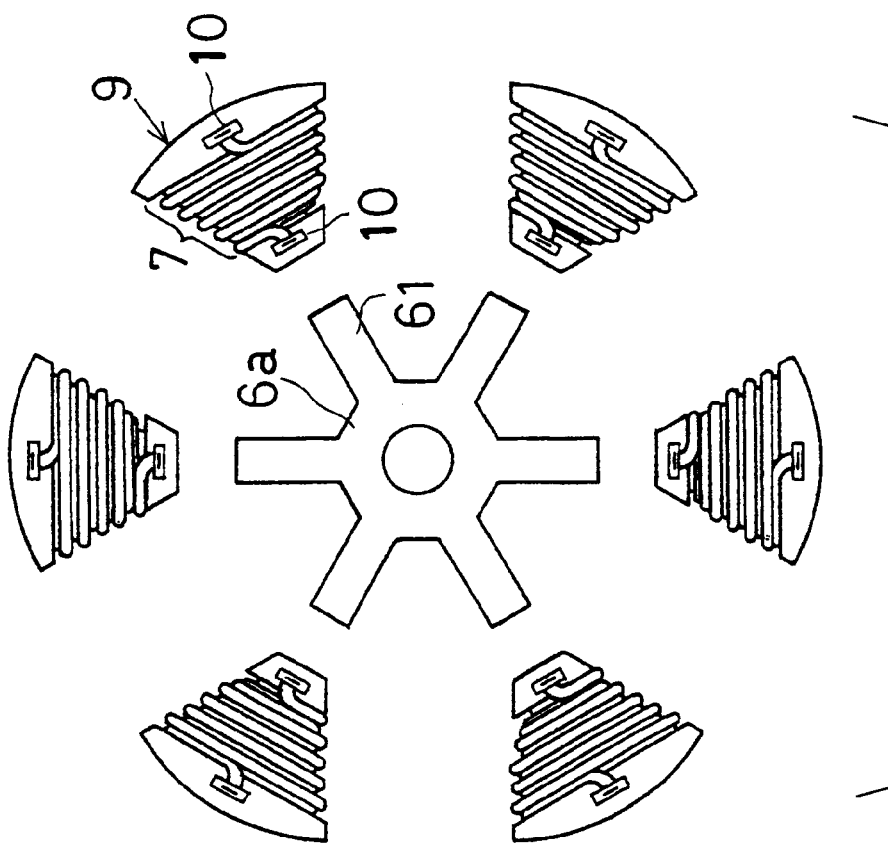
FIG. 3A is a schematic diagram illustrating a plurality of armature coils to be mounted to an internal core.

The armature core 6 is comprised of an internal core 6a that has a plurality of teeth (or salient poles) 61 and a generally cylindrical external core 6b. As shown in FIGS. 3A and 3B, each bobbin 9 around which of the armature coils 7 is wound is fixed to one of teeth 61 of the internal core 6a. Thereafter, the external core 6b is closely fitted to the outer peripheral portion of the teeth 6a, as shown in FIG. 1.

Figure 2B:
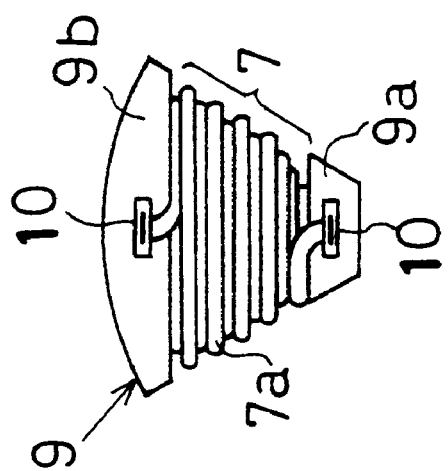
FIG. 2B is a front view of the armature coil.
Figure 2A:
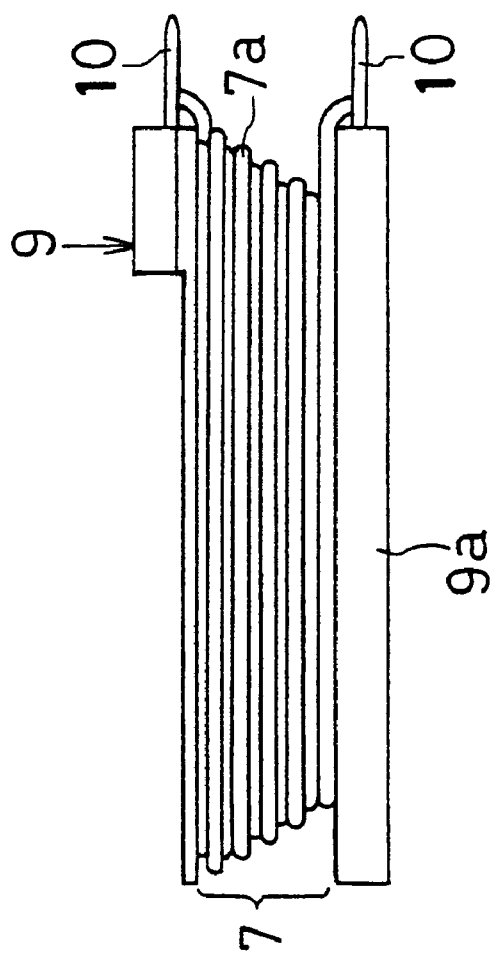
FIG. 2A is a side view of an armature coil of the DC motor according to the first embodiment.

Each bobbin 9 has a hollow body, an inside flange 9a and an outside flange 9b. The bobbins 9 are respectively fixed to the internal core 6a by the hollow bodies that are fitted to the teeth 61 thereof. Each bobbin 9 also has a pair of male terminals 10, which are respectively located at the inside flange 9a and the outside flange 9b, as shown in FIGS. 2A and 2B.

Each armature coil 7 is wound around the body of the bobbin 9 from the radially inside portion to the radially outside portion so that the number of turns of a portion of the armature coil 7 at a more radially outside portion becomes larger to form a trapezoidal or an arc shape. The opposite ends of the armature coil 7 are respectively welded to the pair of male terminals 10. The arc angle of the armature coil with regard to the axis of the arc shape shown in FIG. 2B is about 60°, which is 360°/(the number of poles). This ensures all the bobbins 9 with the armature coils 7 to be assembled into the armature core 6 without gaps, as shown in FIG. 3B.

Figure 4A:
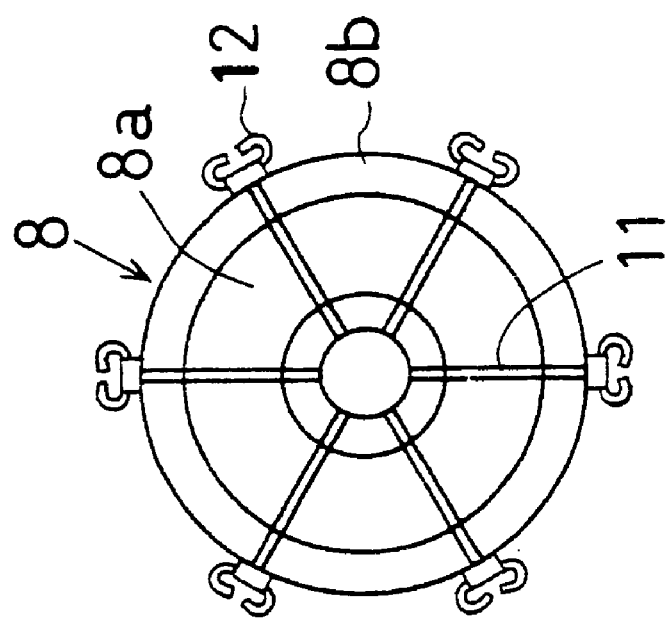
FIG. 4A is a rear view of a commutator of the DC motor according to the first embodiment.
Figure 4B:
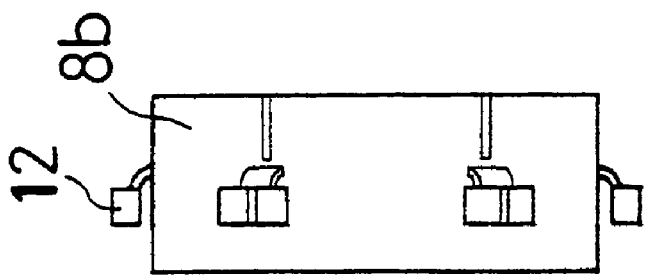
FIG. 4B is a side view of the commutator.
Figure 4C:
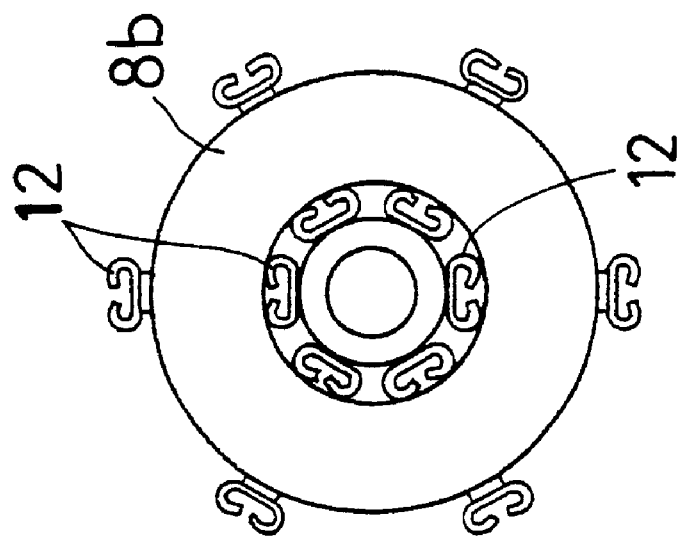
FIG. 4C is a front view of the commutator.

The commutator 8, as shown in FIGS. 4A–4C, is comprised of the same number (e.g. six) of commutator segments 8a as the armature coils 7 and a resinous case 8b for the commutator segments 8a. The six commutator segments 8a are formed from a ring-shaped carbon plate, which is divided into six pieces by three straight radial slits 11 so that each piece or commutator segment 8a has a brush-contact-surface that is perpendicular to the rotary shaft 5 of the armature 4.

The resinous case 8b covers the radially inner and outer peripheries of the commutator segments 8a and the surface thereof opposite the armature coils 7, thereby insulating and supporting the commutator segments 8a. The resinous case 8b has twelve female terminals 12, six of which are located at the outside circumference thereof and the other six of which are located at the inside circumference thereof, as shown in FIG. 4A. Each female terminal 12 is connected to one of the commutator segments 8a inside the resinous case 8b and is located opposite one of the male terminals 10 of the bobbin 9.

Figure 5:
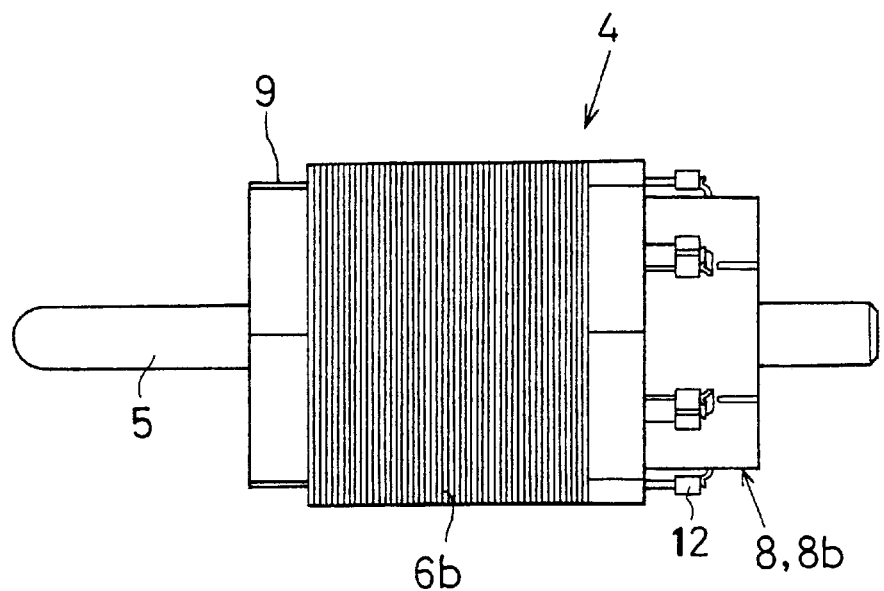
FIG. 5 is a side view of the armature.
Figure 6:
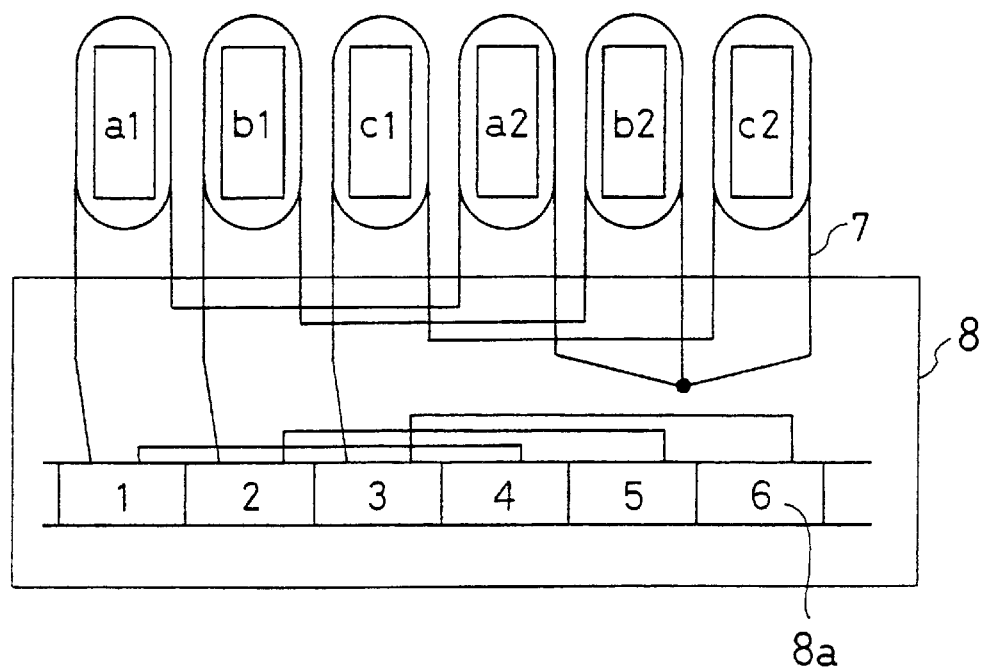
FIG. 6 is a schematic winding diagram of the armature coils.

As shown in FIG. 5, the commutator 8 is fixed to the rotary shaft 5 by force-fitting the hollow portion of the resinous case 8b to the rotary shaft 5. At the same time, the male terminals 10 of the bobbin 9 and the female terminals 12 of the resinous case 8b are coupled in a male-female coupling manner, so that the armature coils 7 are connected each other via the commutator segments 8a as shown in FIG. 6.

Figure 7:
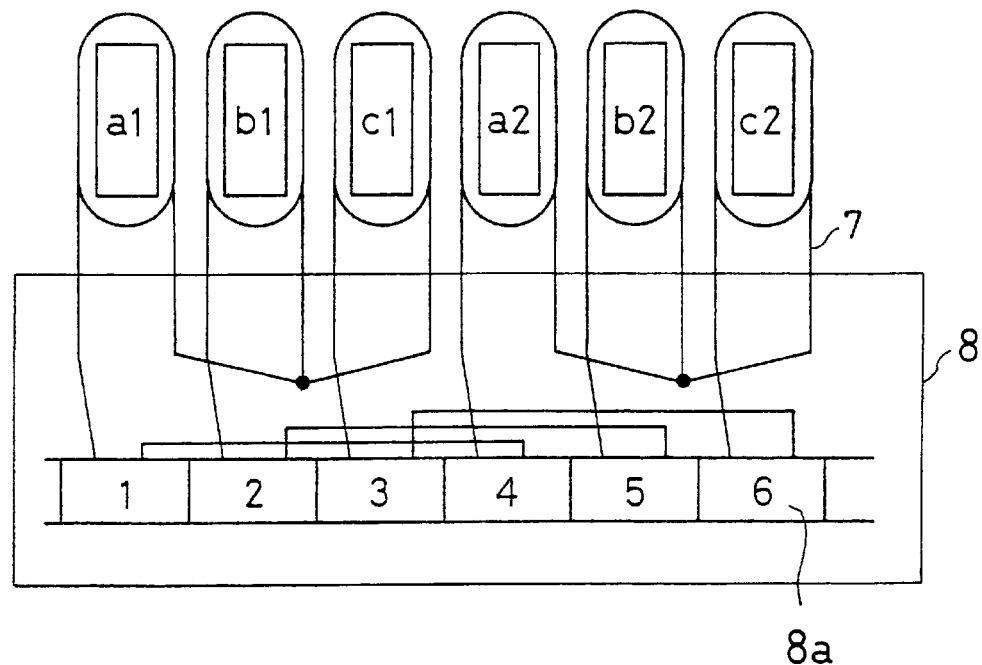
FIG. 7 is a schematic winding diagram of a variation of the armature coils.
Figure 8:
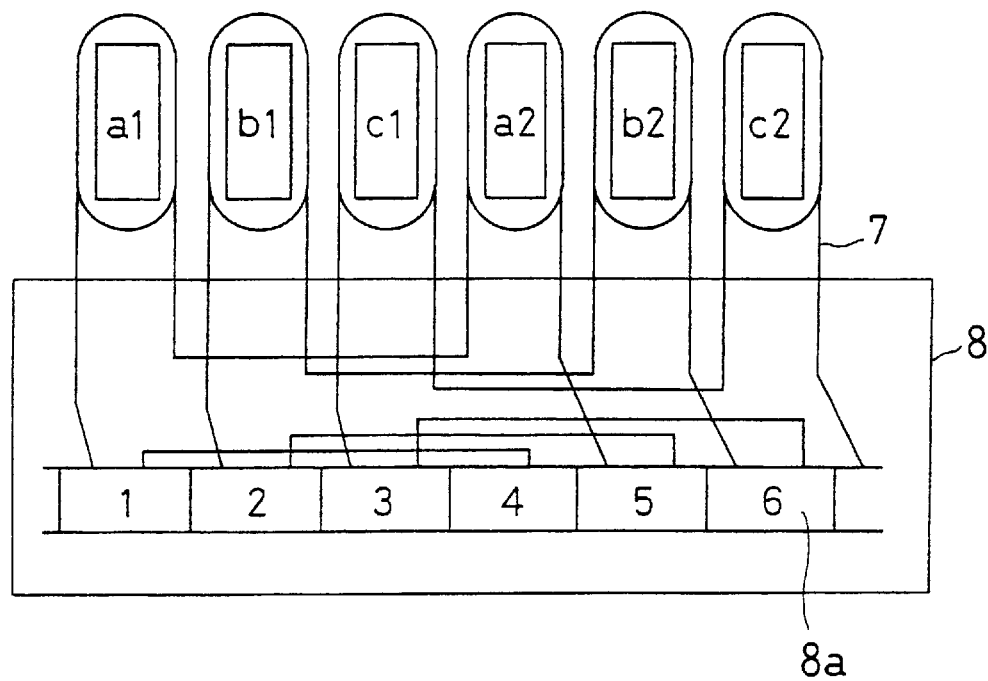
FIG. 8 is a schematic winding diagram of another variation of the armature coils.

Thus, it is not necessary to insert the armature coils 7 into the slots and wind them around the teeth 61. The connection of the armature coils can be easily changed by changing internal connection pattern of the commutator 8, as shown in FIGS. 7 and 8.

The female terminal 10 of the bobbin 9 can be changed to male terminals if the male terminals 12 of the commutator 8 are changed to female terminals. If the internal core 6a is covered with insulation coating, the armature coils 7 can be directly wound around the internal core 6a.

Figure 9:
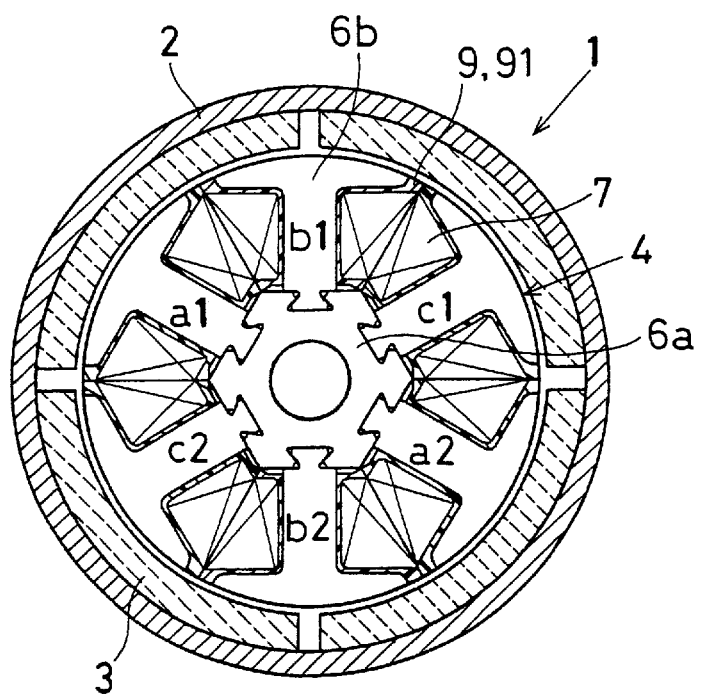
FIG. 9 is a cross-sectional view of a DC motor according to a second embodiment of the invention.

A DC motor according to a second embodiment of the invention is described with reference to FIG. 9 and FIGS. 10A and 10B.

The DC motor 1 according to the second embodiment includes a yoke 2 and four permanent magnets disposed at the inside surface of the yoke 2 that are magnetized in the same manner as the DC motor according to the first embodiment.

Figure 10A:
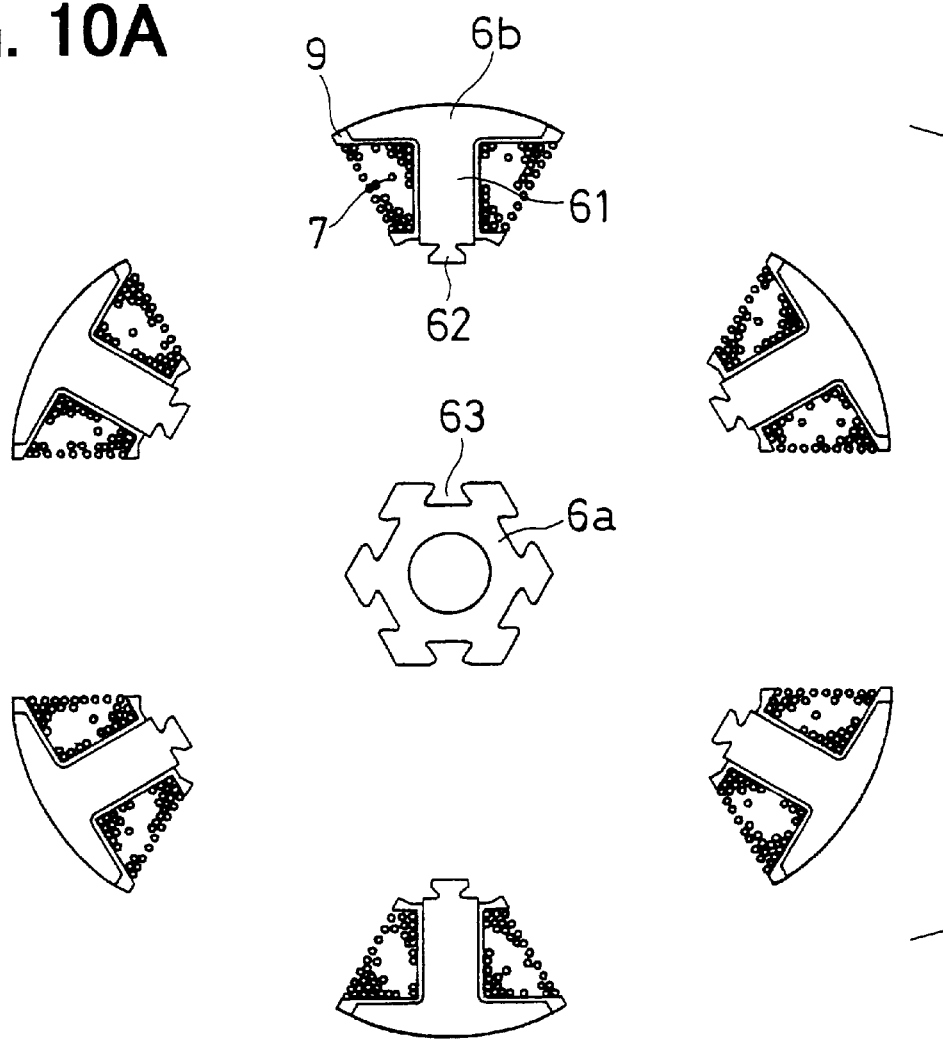
FIG. 10A is a schematic diagram illustrating a plurality of armature coils with armature cores to be assembled together.
Figure 10B:
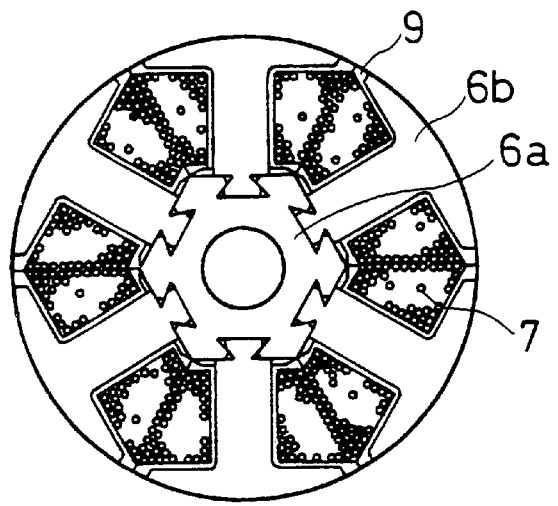
FIG. 10B is a front view of the armature of the DC motor according to the second embodiment.

The armature core 6, as shown in FIG. 10A, is comprised of six external cores 6a and a ring-shaped internal core 6b. Each external core 6a has one of teeth 61 of the armature core 6 and a dovetail projection 62. The internal core 6b has 6 dovetail concavities 63 formed at the outer periphery thereof at circumferentially equal intervals.

Each bobbin 9 is mounted on one of the external cores 6b after the armature coil 7 is wound around the bobbin 9, as shown in FIG. 10A. Then, the dovetail projections 62 of the teeth 61 and the dovetail concavities 63 of the internal core 6a are respectively fitted together, as shown in FIG. 10B. The resinous bobbins 9 have brim portions 91 that fill up the gaps between adjacent external cores 6a to reduce rotation resistance and increase the stiffness thereof. Because the external cores 6b with the teeth 61 are separated, an amount of leakage magnetic flux is smaller than that of the DC motor according to the first embodiment, so that the inductance of the armature coil can be reduced.

The armature coils 7 are connected in the same manner as the armature coils of DC motor according to the first embodiment. If the external cores 6b are covered with insulation coating, the armature coils 7 can be directly wound around the external cores 6b.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A DC motor including a cylindrical yoke having a plurality of permanent magnets for providing a plurality of magnetic poles and a rotatable armature, said armature comprising:

a rotary shaft;

an armature core carried by said rotary shaft and having a plurality of radially extending teeth, said armature core comprising an internal core unit and an external core unit coaxially disposed outside said internal core unit;

a plurality of bobbins respectively mounted on said teeth;

a plurality of armature coils respectively wound around said bobbins;

a commutator having a plurality of commutator segments disposed adjacent said bobbins in an axial direction, said commutator segments having brush contact surfaces perpendicular to said rotary shaft; and a coupler having a plurality of first terminal members fixed to said commutator segments for connecting said commutator segments and said armature coils in a male-female coupling manner in a prescribed connection pattern.

2. The DC motor as claimed in claim 1, wherein said first terminal members of the coupler is integrated with said commutator.

3. The DC motor as claimed in claim 1, wherein each of said plurality of bobbins includes a second terminal member for connecting said armature coils in the male-female coupling manner in the prescribed pattern.

4. The DC motor as claimed in claim 1, wherein said external core unit comprises a plurality of circumferentially separated external cores each of which has one of said teeth and one of said bobbins.

5. The DC motor as claimed in claim 4, wherein said bobbin has a brim portion that fills up a gap between adjacent external cores.

6. The DC motor as claimed in claim 4, wherein said external cores and said internal core unit are connected to each other by projection-concavity connection.

7. The DC motor as claimed in claim 6, wherein each of said external cores has a dovetail projection, and said internal core unit has a plurality of dovetail concavities each of which is fitted to said dovetail projection.

8. The DC motor as claimed in claim 1, wherein said external core unit comprises a plurality of separated external cores each of which has one of said teeth.

9. A DC motor including a cylindrical yoke having a plurality of permanent magnets for providing a plurality of magnetic poles and a rotatable armature, said armature comprising:

a rotary shaft;

an armature core carried by said rotary shaft and having a plurality of radially extending teeth, said armature core comprising an internal core unit and an external core unit coaxially disposed outside said internal core unit;

a plurality of bobbins respectively mounted on said teeth;

a plurality of armature coils respectively wound around said bobbins, each of said armature coils having first and second ends;

a commutator having a plurality of commutator segments disposed adjacent said bobbins, said commutator segments having brush contact surfaces perpendicular to said rotary shaft;

a plurality of first terminal members for connecting said commutator segments and the first ends of said armature coils in a male-female coupling manner; and a plurality of second terminal members for respectively connecting the second ends of said armature coils in a prescribed pattern.

10. A DC motor including a cylindrical yoke having a plurality of permanent magnets for providing a plurality of magnetic poles and a rotatable armature, said armature comprising:

a rotary shaft;

an armature core carried by said rotary shaft and having a plurality of radially extending teeth, said armature core comprising an internal core unit and an external core unit coaxially disposed outside said internal core unit;

a plurality of bobbins respectively mounted on said teeth;

a plurality of armature coils respectively wound around said bobbins;

a commutator having a plurality of commutator segments disposed adjacent said bobbins and a connection member for connecting said commutator segments and said armature coils in a prescribed connection pattern, said commutator segments having brush contact surfaces perpendicular to said rotary shaft; and male-female coupler including a plurality of first terminal members extended from said connection member and second terminal members connected to opposite ends of one of said armature coils and extended from said bobbins, said first terminal members and said second terminal members being respectively coupled.

11. The DC motor as claimed in claim 1, wherein said DC motor is a motor-driven fuel pump.

12. The DC motor as claimed in claim 1, wherein said commutator is disposed adjacent said bobbins in the axial direction.

13. The DC motor as claimed in claim 1, wherein at least one of said armature coil has a trapezoidal cross-section.

14. The DC motor as claimed in claim 1, wherein said armature coils are connected in a star connection pattern.

15. A DC motor including a cylindrical yoke having a plurality of permanent magnets for providing a plurality of magnetic poles and a rotatable armature, said armature comprising:

a rotary shaft;

an armature core carried by said rotary shaft and having a plurality of radially extending teeth, said armature core comprising an internal core unit and an external core unit coaxially disposed outside said internal core unit;

a plurality of bobbins respectively mounted on said teeth;

a plurality of armature coils respectively wound around said bobbins, each of said armature coils having first and second ends;

a commutator having a plurality of commutator segments disposed adjacent said bobbins, said commutator segments having brush contact surfaces perpendicular to said rotary shaft;

a first male-female coupling device including a first terminal member connected to one of the commutator segments and a second terminal member connected to the first end of one of armature coils, the first and second terminal members of the first male-female coupling device being engaged with one another in a male-female coupling manner.

16. The DC motor as claimed in claim 15, further comprising a second male-female coupling device including a first terminal member connected to said one of the commutator segments and a second terminal member connected to the second end of said one of the armature coils, the first and second members of the second male-female coupling device being engaged with one another in a male-female coupling manner.

17. The DC motor as claimed in claim 16, wherein the second male-female coupling device is arranged radially outside of the first male-female coupling device.

* * * * *